(12) United States Patent
Ogawa

(10) Patent No.: US 8,366,184 B2
(45) Date of Patent: Feb. 5, 2013

(54) STRUCTURE FOR VEHICLE BODY UPPER PORTION

(75) Inventor: Yasunobu Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/258,746

(22) PCT Filed: Dec. 22, 2009

(86) PCT No.: PCT/JP2009/071296
§ 371 (c)(1),
(2), (4) Date: Sep. 22, 2011

(87) PCT Pub. No.: WO2010/109732
PCT Pub. Date: Sep. 30, 2010

(65) Prior Publication Data
US 2012/0013150 A1  Jan. 19, 2012

(30) Foreign Application Priority Data

Mar. 26, 2009  (JP) ................................ 2009-077168

(51) Int. Cl.
*B62D 25/04* (2006.01)
(52) U.S. Cl. .................................................. 296/193.06
(58) Field of Classification Search ............. 296/193.01, 296/193.05, 193.06, 187.01, 187.03, 187.12, 296/203.01, 203.03
See application file for complete search history.

(56) References Cited

U.S. PATENT DOCUMENTS

| | | | | |
|---|---|---|---|---|
| 6,073,992 | A * | 6/2000 | Yamauchi et al. | 296/203.01 |
| 6,962,389 | B2 * | 11/2005 | Katsuma | 296/187.12 |
| 7,121,615 | B2 * | 10/2006 | Hoshino | 296/203.03 |
| 7,914,068 | B2 * | 3/2011 | Mizohata | 296/193.06 |
| 7,954,886 | B2 * | 6/2011 | Kinoshita et al. | 296/193.06 |
| 2010/0127532 | A1 * | 5/2010 | Hosaka et al. | 296/193.06 |
| 2011/0241384 | A1 * | 10/2011 | Mori | 296/193.06 |
| 2011/0266837 | A1 * | 11/2011 | Losch et al. | 296/193.06 |

FOREIGN PATENT DOCUMENTS

| | | |
|---|---|---|
| JP | 09-076938 | 3/1997 |
| JP | 2002-096758 | 4/2002 |
| JP | 2006-137208 | 6/2006 |
| JP | 2009-067232 | 4/2009 |

\* cited by examiner

*Primary Examiner* — H Gutman
(74) *Attorney, Agent, or Firm* — Rankin, Hill & Clark LLP

(57) ABSTRACT

A structure for a vehicle body upper portion, having sufficient rigidity, using a reduced number of parts, and capable of being assembled with reduced man-hours. A structure (15) for a vehicle body upper portion includes a roof rail (26) and a center pillar (27) which are connected together at respective ends thereof. The roof rail (26) is formed to have a closed cross-section by an upper member (31) and a lower member (32). An upper joint end section (45) of the upper member projects further toward the outside of the vehicle body than a lower joint end section (46) of the lower member. The center pillar (27) is formed to have a closed cross-section by an inner member (51) and an outer member (52). An outer joint end section (66) of the outer member extends up to the upper joint end section (45) while an inner joint end section (73) of the inner member extends up to the lower joint end section (46). The upper joint end section (45) is joined to the outer joint end section (66), the lower joint end section (46) is joined to the inner joint end section (73), and the closed cross-sections are connected to each other at the joint section (28) between each joint end section.

5 Claims, 9 Drawing Sheets

STRUCTURE FOR VEHICLE BODY UPPER PORTION

TECHNICAL FIELD

The present invention relates to a structure for a vehicle body upper portion in which a roof rail and a pillar of a vehicle are joined together to form an inner framework.

BACKGROUND ART

A structure for a vehicle body upper portion disclosed in Patent Literature 1 is configured such that one end portion of a roof rail formed to have a closed cross-section is flattened, an upper end portion (parallel to the one end portion of the roof rail) of a center pillar formed to have a closed cross-section is flattened in a similar manner, and the flattened one end portion of the roof rail is piled on and joined to the flattened upper end portion of the center pillar. At the joined part there is formed a recess having a U-shaped cross-section.

The roof rail and the center pillar are in a non-continuous state at a part where the one end portion of the roof rail is joined to the upper end portion of the center pillar (that is, a part at which the recess having the U-shaped cross-section is formed), which makes it difficult to secure rigidity.

Under such circumstances, a roof corner gusset (reinforcing member) is provided between the roof rail and the center pillar so as to stride over the recess having the U-shaped cross-section, and the roof corner gusset is bolted to the roof rail and the center pillar, to reinforce the recess having the U-shaped cross-section (non-continuous part) for securing of the rigidity at the non-continuous part.

PRIOR ART REFERENCES

Patent Literature

Patent Literature 1: Japanese Patent No. 3796777

SUMMARY OF INVENTION

Technical Problem

However, in the structure for a vehicle body upper portion in Patent literature 1, the roof corner gusset needs to be bolted to secure the rigidity at the non-continuous part. In such a manner, for bolting the roof corner gusset, the number of parts is increased, and the number of man-hours for assembling is increased.

It is an object of the present invention to provide a structure for a vehicle body upper portion, which can secure sufficient rigidity, is able to reduce the number of parts used, and is capable of being assembled with reduced man-hours.

Solution to Problem

According to one aspect of the present invention, there is provided a structure for a vehicle body upper portion including a vehicle body framework structure, comprising: an inner framework formed by a roof rail and a pillar joined together; a roof side rail extending in a direction intersecting with the inner framework; a roof panel joined to the inner framework; and an outer panel joined to the inner framework, wherein the roof rail has an upper member and a lower member and the upper member and the lower member are joined together to jointly define a closed cross-section, wherein a joint end section of the upper member projects further to an outside of a vehicle body than a joint end section of the lower member, wherein the pillar has an inner member and an outer member and the inner member and the outer member are joined together to jointly define a closed cross-section, wherein a joint end section of the outer member extends up to the joint end section of the upper member, and a joint end section of the inner member extends up to the joint end section of the lower member, and wherein the respective joint end sections of the upper member and the outer member are joined together and the respective joint end sections of the lower member and the inner member are joined together to thereby form the inner framework, and the respective closed cross-sections are connected to each other at a joint section of the respective joint end sections.

Preferably, the roof panel has a stepped portion, the outer panel has a stepped portion, the stepped portion of the roof panel and the stepped portion of the outer panel are joined together to form a recess having a U-shaped cross-section by the respective stepped portions, and the inner member of the pillar has at a lower side portion of the recess a vertical bead extending in an up-down direction and a horizontal bead extending in a front-rear direction of the vehicle body.

Preferably, the vertical bead transmits a side collision load to the lower member of the roof rail.

Preferably, the horizontal bead transmits a frontal collision or rear collision load to the roof side rail.

Preferably, the vertical beads constituting a pair are provided to be spaced in the front-rear direction of the vehicle body, and the horizontal bead is located between the vertical beads constituting the pair.

Preferably, the joint end sections of the roof rail are piled from an upper side on and joined to the joint end sections at an upper end of the pillar.

Advantageous Effects of Invention

According to the present invention, the respective joint end sections of the upper member of the roof rail and the outer member of the pillar are joined while the respective joint end sections of the lower member of the roof rail and the inner member of the pillar are joined. Thereby, the joint section at which the respective joint end sections are joined can be formed to have a closed cross-section. Accordingly, the closed cross-section of the roof rail and the closed cross-section of the pillar are connected to each other at the joint section. The closed cross-section of the roof rail and the closed cross-section of the pillar are connected to each other at the joint section of the respective joint end sections in such a manner to secure sufficient rigidity at the joint section of the respective joint end sections.

In addition, by securing the rigidity at the joint section of the respective joint end sections, the joint section of the respective joint end sections does not need to be reinforced by a reinforcing member. Since this can dispense with the reinforcing member, the number of parts can be reduced, and the assembling man-hours can be reduced.

The vertical bead extending in the up-down direction is provided in the inner member of the pillar on the lower side of the recess. Thus, in a case where a load in a vehicle width direction (side collision load) acts on the pillar, the load can be transmitted to the roof rail via the vertical bead efficiently.

The horizontal bead extending in the front-rear direction of the vehicle body is provided in the inner member of the pillar on the lower side of the recess. Thus, in a case where a load in the front-rear direction of the vehicle body (a frontal collision load or a rear collision load) is effected, the effected load can be transmitted via the horizontal bead efficiently in the front-rear direction of the vehicle body.

In this manner, by providing the vertical bead and the horizontal bead on the lower side of the recess, the load in the vehicle width direction (side collision load) and the load in the front-rear direction of the vehicle body (the frontal collision load or the rear collision load) can be transmitted efficiently even in a case where no reinforcing member is provided on the lower side of the recess.

DESCRIPTION OF EMBODIMENTS

One preferred structural embodiment of the present invention will be described below with reference to the accompanying drawings.

Figure 1:
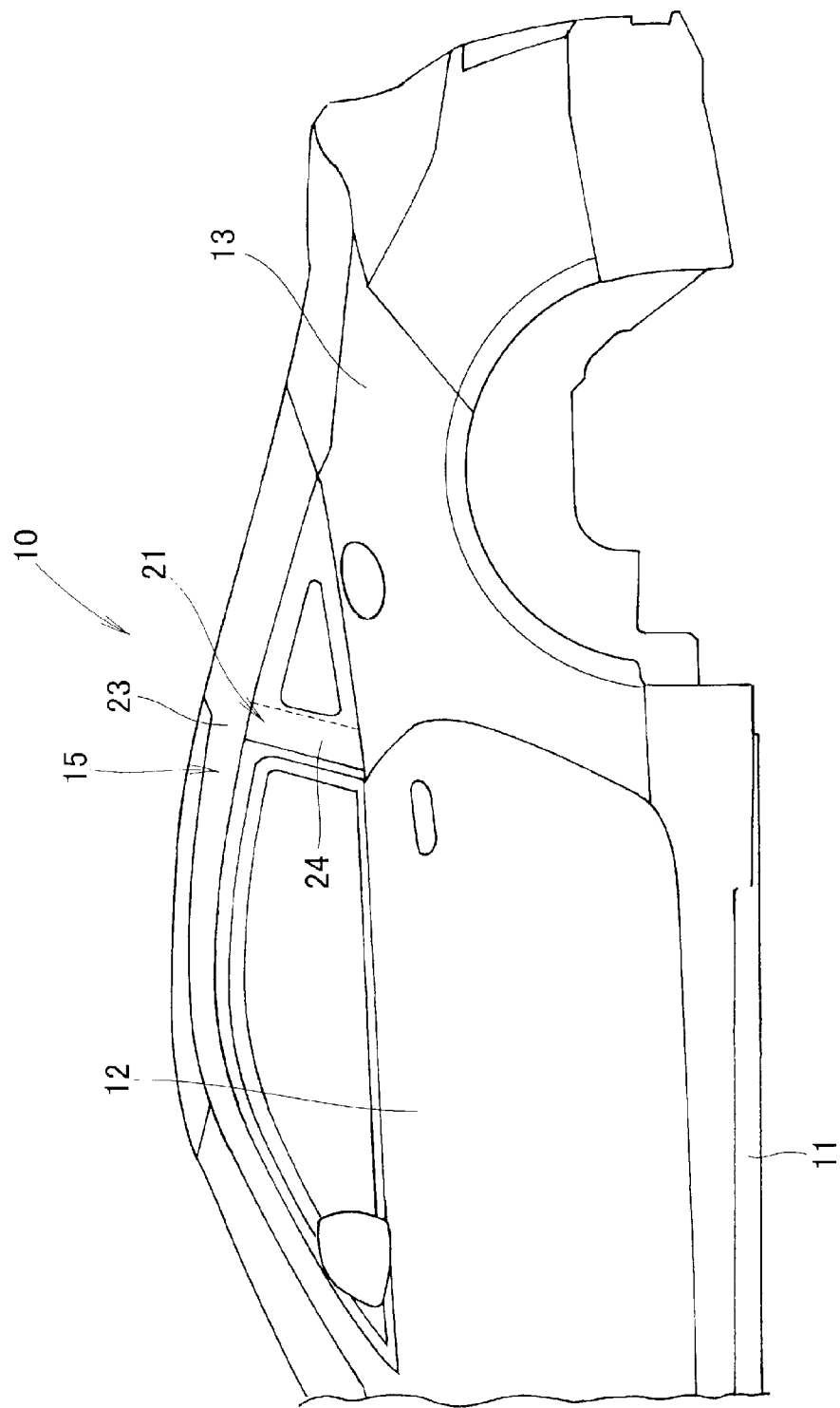
FIG. 1 is a side view of a vehicle having a structure for a vehicle body upper portion according to the present invention.

As shown in FIG. 1, a vehicle 10 has a side sill 11, a side door 12 provided on the upper side of the side sill 11, a rear fender 13 provided on the back side of the side door 12, and a structure 15 for a vehicle body upper portion provided on the upper sides of the rear fender 13 and the side door 12.

Figure 2:
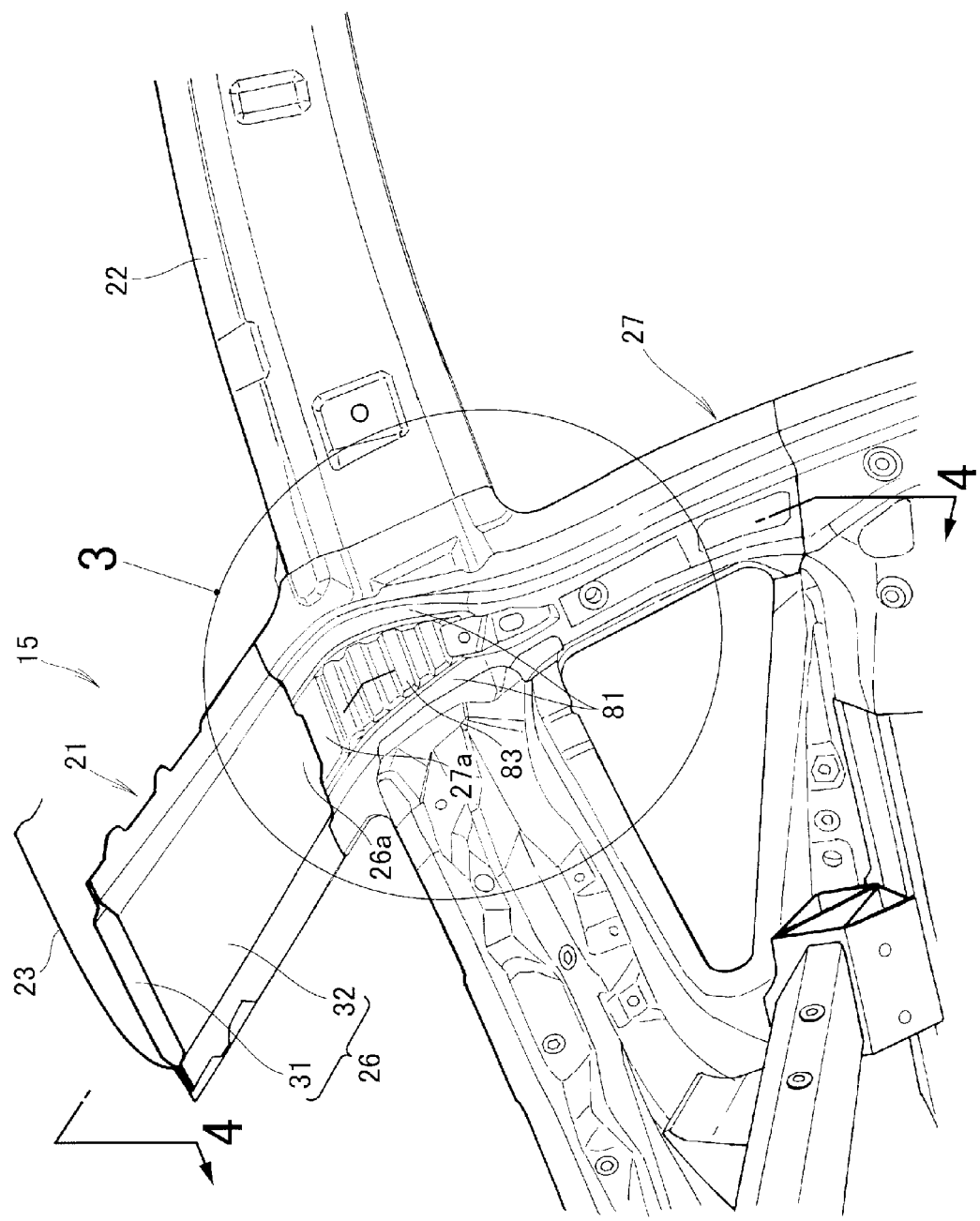
FIG. 2 is a perspective view of the structure for a vehicle body upper portion according to the present invention.
Figure 3:
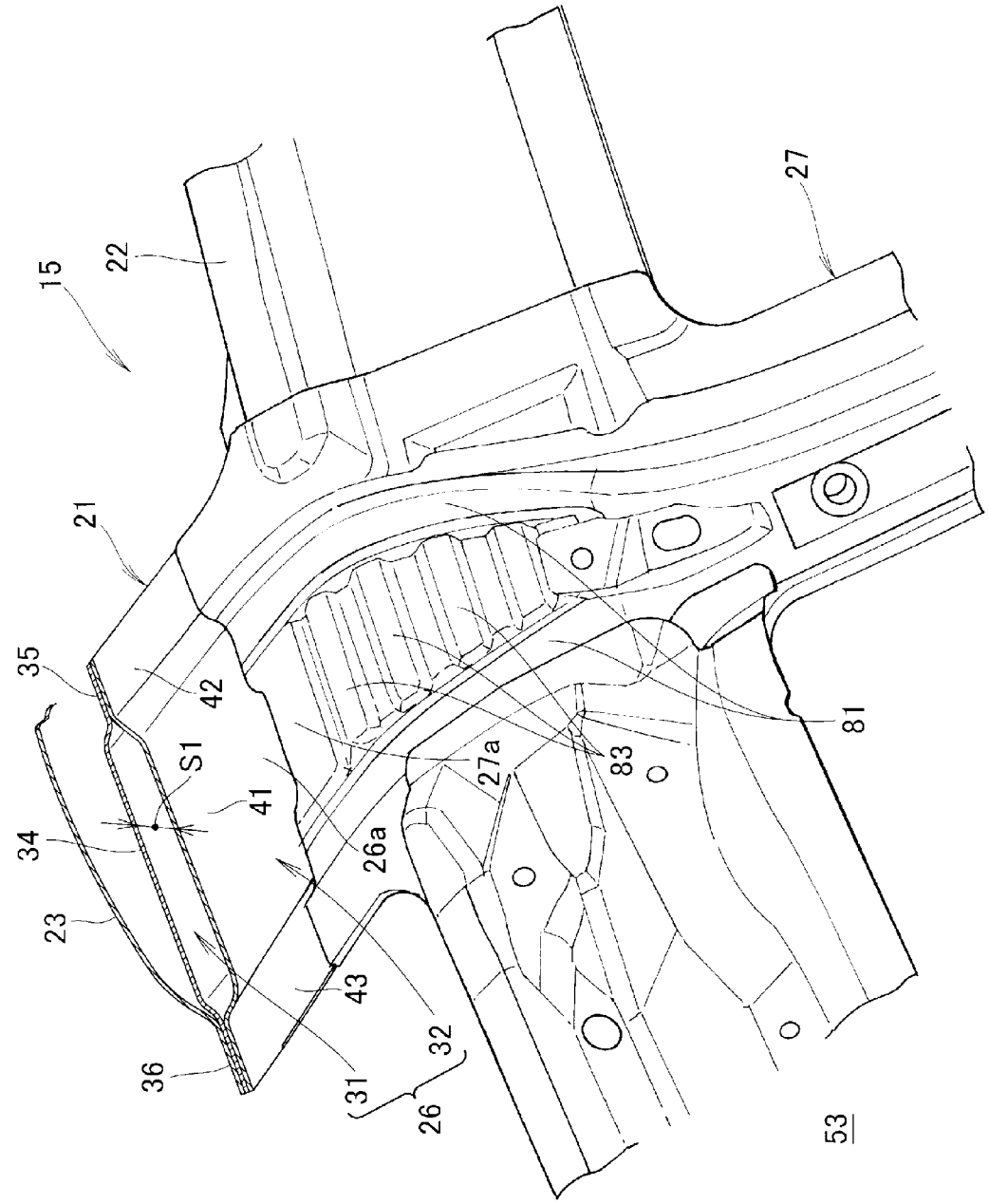
FIG. 3 is an enlarged view of the area 3 in FIG. 2.

As shown in FIGS. 2 and 3, the structure 15 for a vehicle body upper portion has an inverted U-shaped inner framework 21 provided on the back side of the side door 12 (FIG. 1), a roof side rail 22 extending in a direction intersecting with the inner framework 21, a roof panel 23 covered at the upper portions of the roof side rail 22 and the inner framework 21, and an outer panel 24 (FIG. 4) covered at the outside portion of the inner framework 21.

The inner framework 21 has a roof rail 26 extending in a vehicle width direction and a center pillar (pillar) 27 whose upper end portion 27a is connected to an end portion 26a of the roof rail 26.

The roof rail 26 has an upper member 31 extending in the vehicle width direction and a lower member 32 provided on the lower side of the upper member 31.

The upper member 31 has an upper swelling portion 34 swelling upward, a front flange 35 provided along the front side of the upper swelling portion 34, and a back flange 36 provided along the back side of the upper swelling portion 34. The lower member 32 has a lower swelling portion 41 swelling downward, a front flange 42 provided along the front side of the lower swelling portion 41, and a back flange 43 provided along the back side of the lower swelling portion 41.

The front flange 35 of the upper member 31 and the front flange 42 of the lower member 32 are joined (by spot welding) while the back flange 36 of the upper member 31 and the back flange 43 of the lower member 32 are joined (by spot welding). Thereby, the roof rail 26 is formed to have a closed cross-section as the upper member 31 and the lower member 32 are joined. In this state, the upper swelling portion 34 of the upper member 31 and the lower swelling portion 41 of the lower member 32 are spaced apart from each other with a space S1.

Figure 4:
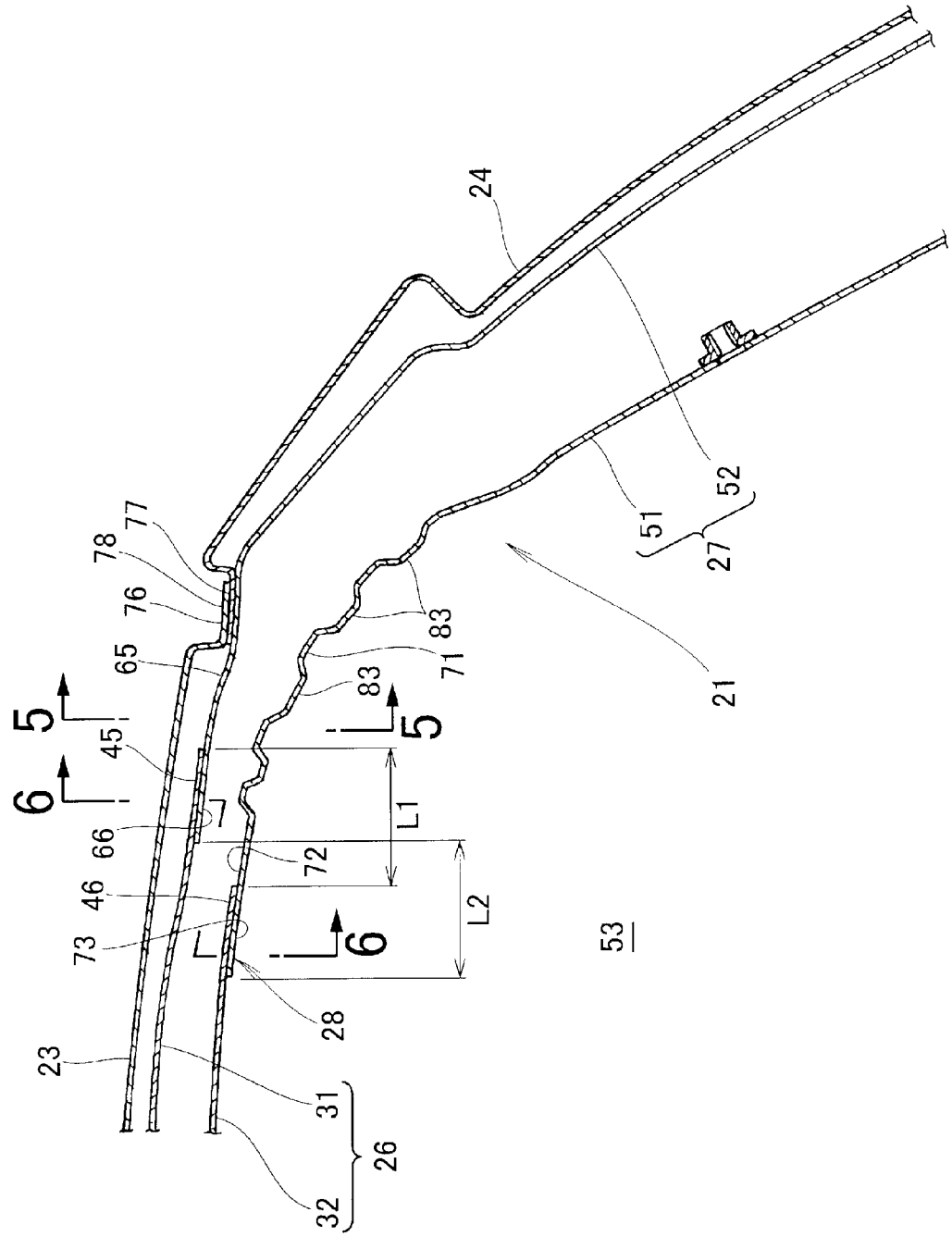
FIG. 4 is a cross-sectional view taken along line 4-4 of FIG. 2.

As shown in FIG. 4, an upper joint end section (joint end section) 45 of the upper member 31 of the roof rail 26 projects further to the outside of the vehicle body by a length L1 than a lower joint end section (joint end section) 46 of the lower member 32.

Figure 5:
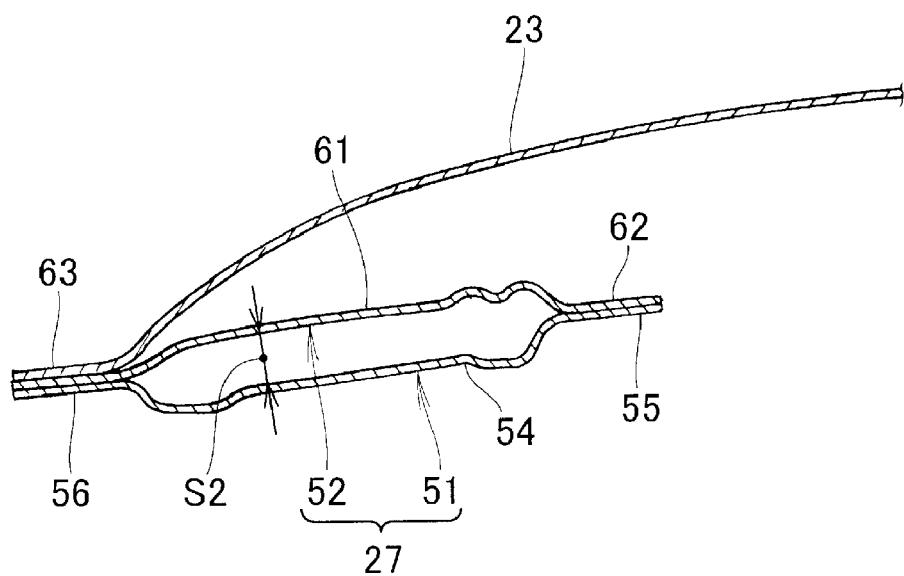
FIG. 5 is a cross-sectional view taken along line 5-5 of FIG. 4.

As shown in FIGS. 4 and 5, the center pillar 27 has an inner member 51 extending in an inclined manner in a vertical or up-down direction and an outer member 52 provided being spaced apart from the inner member 51 to be further to the outside of the vehicle body than the inner member 51.

The inner member 51 has an inner swelling portion 54 swelling in a direction of a cabin 53, a front flange 55 provided along the front side of the inner swelling portion 54, and a back flange 56 provided along the back side of the inner swelling portion 54.

The outer member 52 has an outer swelling portion 61 swelling in a direction of the outside of the vehicle body, a front flange 62 provided along the front side of the outer swelling portion 61, and a back flange 63 provided along the back side of the outer swelling portion 61.

The front flange 55 of the inner member 51 and the front flange 62 of the outer member 52 are joined together (by spot welding) while the back flange 56 of the inner member 51 and the back flange 63 of the outer member 52 are joined together (by spot welding).

Thus, as for the center pillar 27, the inner member 51 and the outer member 52 are joined together to have a cross-section in a direction perpendicular to a longitudinal direction, which is formed to be a closed cross-section. In this state, the distance between the inner swelling portion 54 of the inner member 51 and the outer swelling portion 61 of the outer member 52 is set to a space S2.

The outer member 52 has an upper outer bent portion 65 bent in a direction toward a vehicle width center. An outer joint end section (joint end section) 66 of the outer member 52 is continued from the upper outer bent portion 65 and extends up to the upper joint end section 45 of the upper member 31 of the roof rail 26. The inner member 51 has an upper curved portion 71 bent in a curve in the vehicle width center direction. An upper inner bent portion 72 continued from the upper curved portion 71 is bent in the vehicle width center direction, and an inner joint end section (joint end section) 73 of the inner member 51 extends up to the lower joint end section 46 of the lower member 32.

The outer joint end section 66 extends to the upper joint end section 45 while the inner joint end section 73 extends to the lower joint end section 46 to cause the inner joint end section 73 to be projected further in the vehicle width center direction by a length L2 than the outer joint end section 66.

The upper joint end section 45 and the outer joint end section 66 are joined together, and the lower joint end section 46 and the inner joint end section 73 are joined together, whereby the roof rail 26 and the center pillar 27 are joined together at a joint section 28. By thus joining the roof rail 26 and the center pillar 27 at the joint section 28, the roof rail 26 and the center pillar 27 jointly form the inner framework 21.

Figure 6:
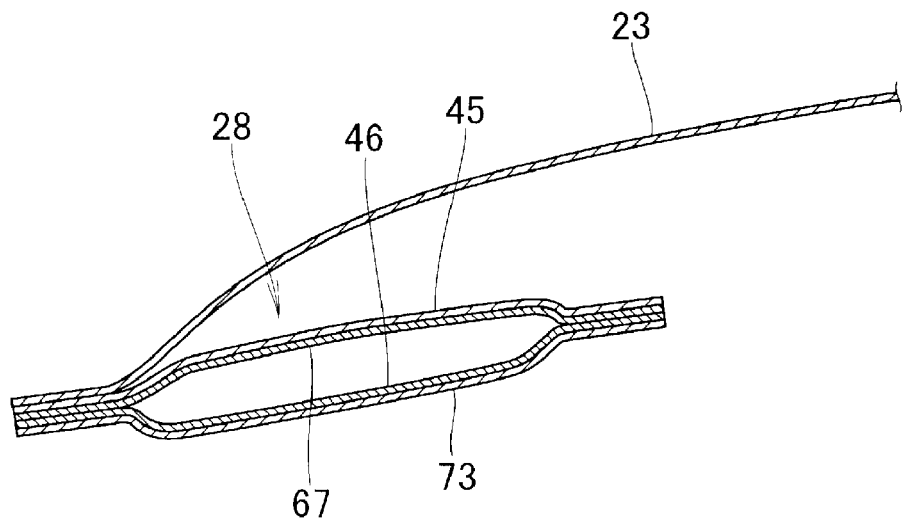
FIG. 6 is a cross-sectional view taken along line 6-6 of FIG. 4.

As shown in FIG. 6, the joint section 28 is formed to have a closed cross-section in a similar manner to those of the roof rail 26 and the center pillar 27. By forming the joint section 28 to have the closed cross-section, the closed cross-section of the roof rail 26 and the closed cross-section of the center pillar 27 are connected or continued to each other in a closed cross-sectional state at the joint section 28. Because the closed cross-section of the roof rail 26 and the closed cross-section of the center pillar 27 are thus connected to each other at the joint section 28, it is possible to secure sufficient rigidity of the joint section 28.

In addition, by securing the rigidity at the joint section 28, the joint section 28 does not need to be reinforced by a reinforcing member. Since this can dispense with the reinforcing member, the number of parts can be reduced, and the assembling man-hours can be reduced.

The upper portions of the inner framework 21 and the roof side rail 22 are covered with the roof panel 23. In the roof panel 23, there is formed a roof stepped portion (stepped portion) 76 on the outer side toward the outside of the vehicle body. The outside portion of the inner framework 21 is covered with the outer panel 24. In the outer panel 24 is formed with an outer stepped portion (stepped portion) 77 on the upper side.

In a state that the outer stepped portion 77 is piled on the upper outer bent portion 65 of the outer member 52 of the center pillar 27, and where the roof stepped portion 76 is piled on the outer stepped portion 77, the upper outer bent portion 65, the roof stepped portion 76, and the outer stepped portion 77 are joined (by spot welding). The outer stepped portion 77 and the roof stepped portion 76 are joined together to form a recess 76 having a U-shaped cross-section by and between the outer stepped portion 77 and the roof stepped portion 76.

On the lower side of the recess 78 having the U-shaped cross-section is provided with the upper curved portion 71 of the inner member 51. The upper curved portion 71 has a plurality of vertical beads 81 (FIG. 3) extending in a curve in the up-down direction and a plurality of horizontal beads 83 extending linearly in a longitudinal or front-rear direction of the vehicle body. By thus providing the vertical beads 81 and the horizontal beads 83 on the upper curved portion 71, the vertical beads 81 and the horizontal beads 83 are provided on the lower side of the recess 78 having the U-shaped cross-section.

Here, the upper curved portion 71 is provided at a part of the inner framework 21 intersecting with the roof side rail 22. That is, the vertical beads 81 and the horizontal beads 83 are provided at parts intersecting with the roof side rail 22.

The plurality of vertical beads 81 are parts swelling to the side of the cabin 53 at both the side portions of the upper curved portion 71 in the front-rear direction of the vehicle body and a pair of reinforcing parts extending in a curve in the up-down direction (extending direction of the inner framework 21). The vertical beads 81 constituting a pair are provided to be spaced at a predetermined distance, and the horizontal beads 83 are provided between the vertical beads 81 constituting a pair.

The plurality of horizontal beads 83 are parts (refer to FIG. 4 as well) swelling to the side of the cabin 53 between the vertical beads 81 constituting a pair and a plurality of reinforcing parts extending linearly in the front-rear direction of the vehicle body (extending direction of the inner framework 21). By providing the pair of vertical beads 81 at both the side portions of the upper curved portion 71 in the front-rear direction of the vehicle body and providing the plurality of horizontal beads 83 between the vertical beads 81 constituting a pair, the vertical beads 81 and the horizontal beads 83 can be provided at the upper curved portion 71 in a compact manner.

By providing the vertical beads 81 extending in the up-down direction at the upper curved portion 71, in a case where a load in the vehicle width direction (side collision load) acts on the center pillar 27, the load can be transmitted to the roof rail 26 via the vertical beads 81 efficiently.

In addition, by providing the plurality of horizontal beads 83 extending in the front-rear direction of the vehicle body at the upper curved portion 71, in a case where a load in the front-rear direction of the vehicle body (a frontal collision load or a rear collision load) is effected, the effected load can be transmitted to the roof side rail 22 via the horizontal beads 83 efficiently (in the front-rear direction of the vehicle body).

In this manner, by providing the vertical beads 81 and the horizontal beads 83 on the lower side of the recess 78, the load in the vehicle width direction (side collision load) and the load in the front-rear direction of the vehicle body (the frontal collision load or the rear collision load) can be transmitted efficiently even in a case where no reinforcing member is provided on the lower side of the recess 78.

Next, a procedure to join the roof rail 26 and the center pillar 27 of the structure 15 for a vehicle body upper portion will be described based on FIGS. 5 and 7 to 9.

As shown in FIG. 5, the front flange 55 of the inner member 51 and the front flange 62 of the outer member 52 are joined (by spot welding) while the back flange 56 of the inner member 51 and the back flange 63 of the outer member 52 are joined (by spot welding). The inner member 51 and the outer member 52 are thus joined together to form the center pillar 27.

Figure 7A:
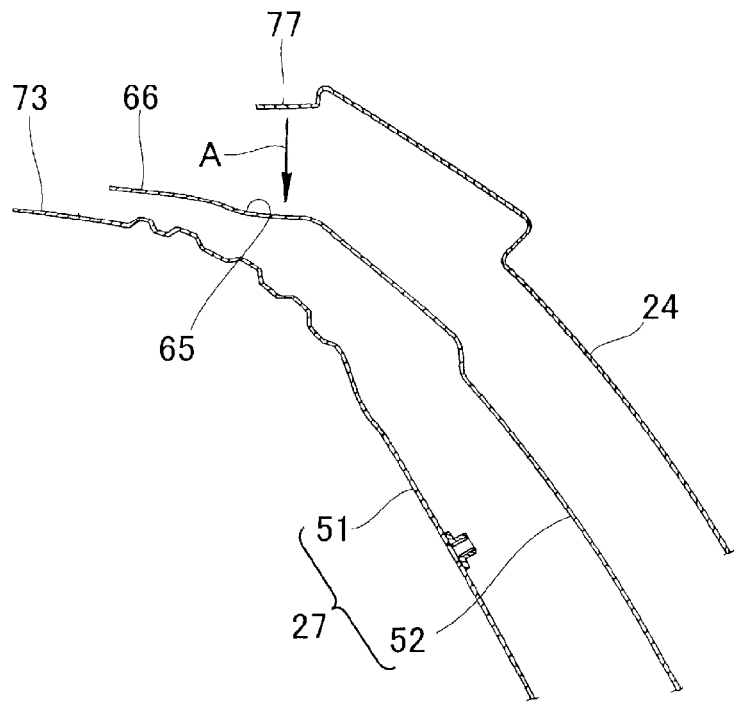
FIGS. 7(a) and 7(b) are views illustrative of a manner in which an outer panel is joined to a center pillar shown in FIG. 4.

As shown in FIG. 7(a), the outer stepped portion 77 of the outer panel 24 is piled on the upper outer bent portion 65 of the center pillar 27 (specifically, the outer member 52) as indicated by the arrow A.

Figure 7B:
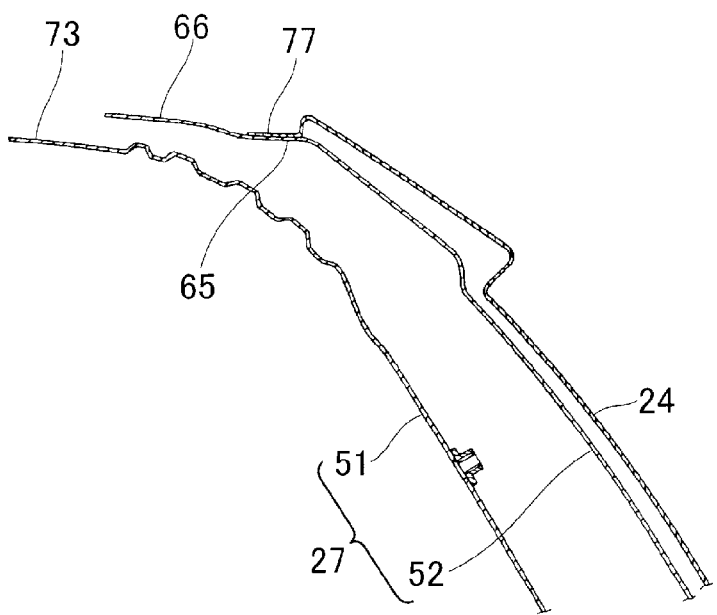

As shown in FIG. 7(b), the outer stepped portion 77 is joined (by spot welding) to the upper outer bent portion 65.

Figure 8A:
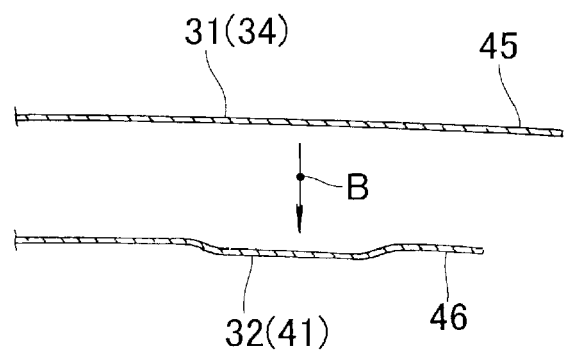
FIGS. 8(a) through 8(d) are views illustrative of a manner in which an upper member and a lower member constituting a roof of FIG. 4 are joined together.
Figure 8B:
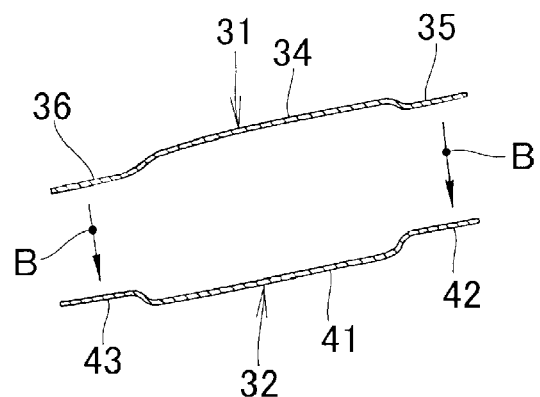

As shown in FIGS. 8(a) and 8(b), the upper member 31 is moved toward the lower member 32 as indicated by the arrow B. The front flange 35 of the upper member 31 and the front flange 42 of the lower member 32 are piled on each other while the back flange 36 of the upper member 31 and the back flange 43 of the lower member 32 are piled on each other.

Figure 8C:
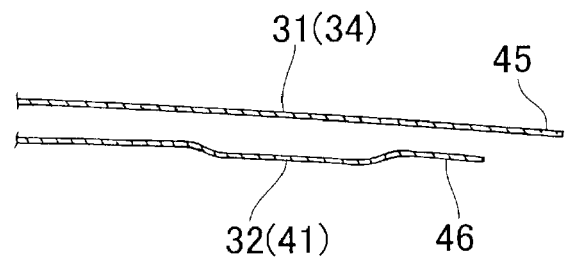
Figure 8D:
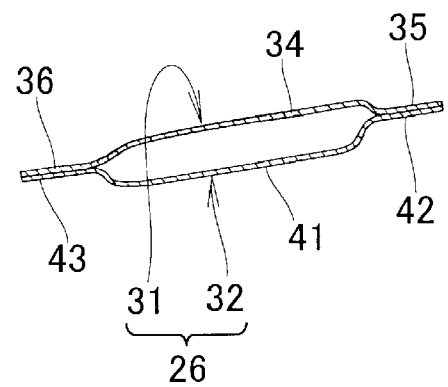

As shown in FIGS. 8(c) and 8(d), the front flange 35 of the upper member 31 and the front flange 42 of the lower member 32 are joined (by spot welding) while the back flange 36 of the upper member 31 and the back flange 43 of the lower member 32 are joined (by pot welding). The upper member 31 and the lower member 32 are thus joined together to form the roof rail 26.

Figure 9:
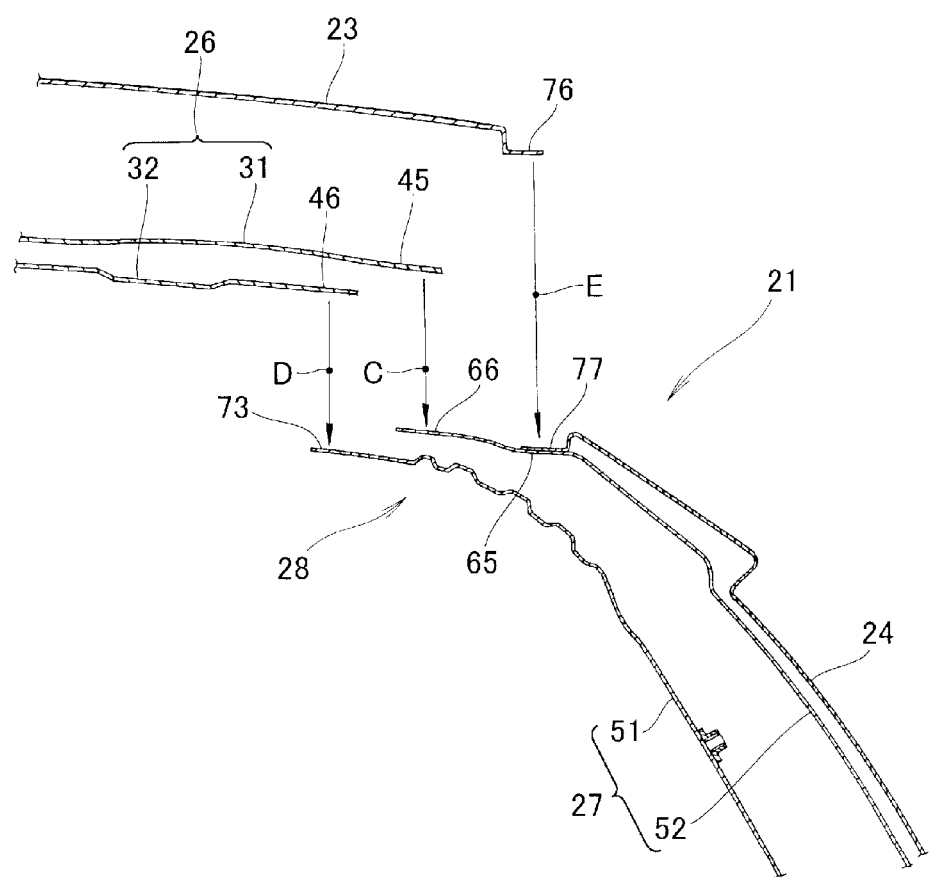
FIG. 9 is a view illustrative of a manner in which the roof rail is joined to the center pillar.

As shown in FIG. 9, the upper joint end section 45 is piled on the outer joint end section 66 as indicated by the arrow C while the lower joint end section 46 is piled on the inner joint end section 73 as indicated by the arrow D. The upper joint end section 45 and the outer joint end section 66 are joined together while the lower joint end section 46 and the inner joint end section 73 are joined together. The roof rail 26 and the center pillar 27 are joined together at the joint section 28 to form the inner framework 21.

Subsequently, the roof stepped portion 76 of the roof panel 23 is piled on the outer stepped portion 77 of the outer panel 24 as indicated by the arrow E. In a state that the roof stepped portion 76 is piled on the outer stepped portion 77, the outer stepped portion 77 and the roof stepped portion 76 are joined (spot welding). Thereby, the outer stepped portion 77 and the roof stepped portion 76 form the recess 78 (FIG. 4) having the U-shaped cross-section.

Figure 10:
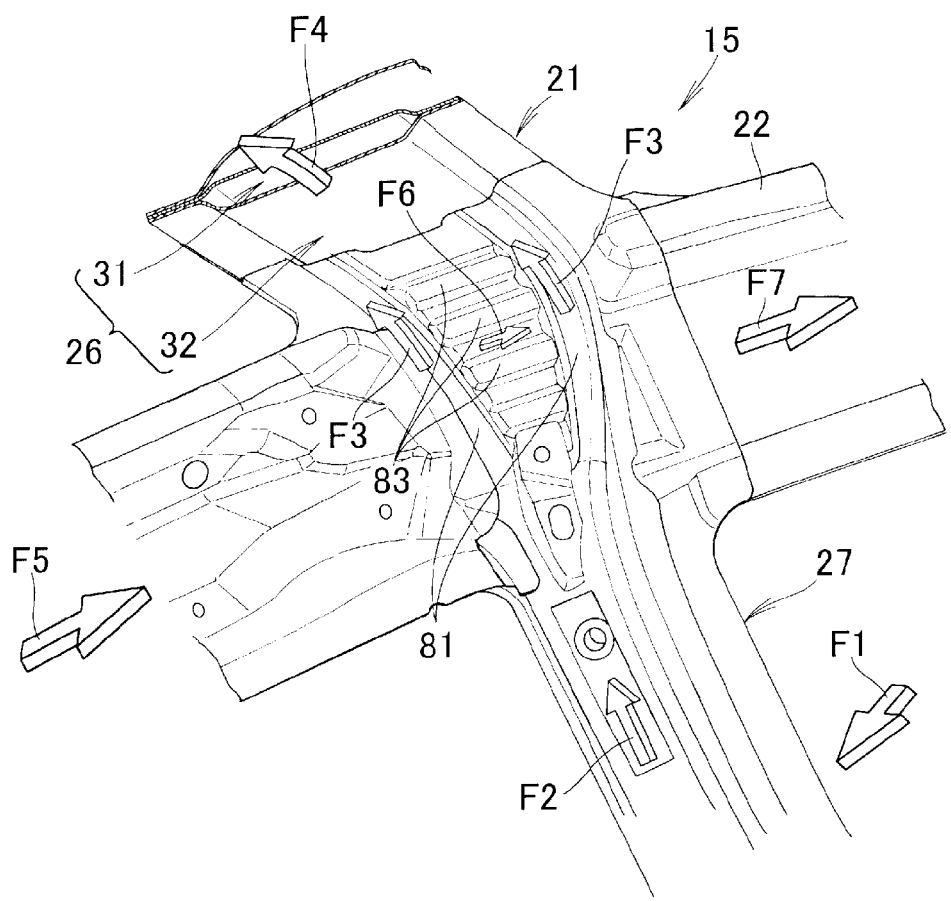
FIG. 10 is a view exemplifying a manner of transmission of loads via a vertical bead and a horizontal bead of the structure for a vehicle body upper portion.

Next, a manner of transmitting a load via the vertical beads 81 and the horizontal beads 83 of the structure 15 for a vehicle body upper portion will be described based on FIG. 10. As shown in FIG. 10, in a case where a load in the vehicle width direction (side collision load) F1 acts on the center pillar 27, a component force of the load F1 acts in a longitudinal direction of the center pillar 27 as a load F2.

The load F2 is transmitted to the vertical beads 81 of the upper curved portion 71 as loads F3, which are transmitted from the vertical beads 81 to the roof rail 26 as a load F4. In this manner, by providing the vertical beads 81 at the upper curved portion 71 (FIG. 4), the load F2 applied to the center pillar 27 can be transmitted via the vertical beads 81 to the roof rail 26 as the load F4 efficiently.

In a case where a load of the back side of the vehicle body (rear collision load) F5 acts on the back portion of the roof side rail 22, the load F5 is transmitted to the horizontal beads 83 of the upper curved portion 71 (FIG. 4) as loads F6, which are transmitted from the horizontal beads 83 in a direction of the front portion of the vehicle body of the roof side rail 22 as a load F7.

In this manner, by providing the horizontal beads 83 at the upper curved portion 71, the load F5 applied to the back portion of the roof side rail 22 can be transmitted via the horizontal beads 83 in the direction of the front portion of the vehicle body of the roof side rail 22 as the load F7 efficiently.

By providing the horizontal beads 83 at the upper curved portion 71 (FIG. 4), it is also possible for a load effected on the front portion of the roof side rail 22 to be transmitted via the horizontal beads 83 in a direction of the back portion of the vehicle body of the roof side rail 22 efficiently.

The structure 15 for a vehicle body upper portion according to the present invention is not limited to the foregoing embodiments but can be altered or improved arbitrarily. For example, although the center pillar 27 has been illustrated as a pillar in the foregoing embodiment, the invention is not limited to the illustrated embodiment, and other pillars such as a front pillar and a rear pillar can also be used.

Although the plurality of vertical beads 81 and the plurality of horizontal beads 83 have been illustrated in the foregoing embodiment, the invention is not limited to the illustrated embodiment, and a single vertical bead 81 and a single horizontal bead 83 can be provided, for example.

Also, although both the vertical beads 81 and the horizontal beads 83 have been provided in the foregoing embodiment, the invention is not limited to the illustrated embodiment, and either the vertical beads 81 or the horizontal beads 83 may be provided.

Further, the shapes of the inner framework 21, the roof panel 23, the outer panel 24, the roof rail 26, the center pillar 27, the joint section 28, the upper member 31, the lower member 32, the upper joint end section 45, the lower joint end section 46, the inner member 51, the outer member 52, the outer joint end section 66, the inner joint end section 73, the roof stepped portion 76, the outer stepped portion 77, the recess 78, the vertical bead 81, and the horizontal bead 83 are not limited to those illustrated but can be altered arbitrarily.

INDUSTRIAL APPLICABILITY

The present invention is particularly suitable for application to an automobile having a structure for a vehicle body upper portion in which a roof rail and a pillar are joined together to form an inner framework.

REFERENCE SIGNS LIST 15 structure for a vehicle body upper portion
21 inner framework
23 roof panel
24 outer panel
26 roof rail
27 center pillar (pillar)
28 joint section
31 upper member
32 lower member
45 upper joint end section (joint end section)
46 lower joint end section (joint end section)
51 inner member
52 outer member
66 outer joint end section (joint end section)
73 inner joint end section (joint end section)
76 roof stepped portion (stepped portion)
77 outer stepped portion (stepped portion)
78 recess
81 vertical bead
83 horizontal bead

The invention claimed is:

1. A structure for a vehicle body upper portion including a vehicle body framework structure, comprising:
an inner framework formed by a roof rail and a pillar joined together;
a roof side rail extending in a direction intersecting with the inner framework;
a roof panel joined to the inner framework; and
an outer panel joined to the inner framework,
wherein the roof rail has an upper member and a lower member and the upper member and the lower member are joined together to jointly define a closed cross-section,
wherein a joint end section of the upper member projects further to an outside of a vehicle body than a joint end section of the lower member,
wherein the pillar has an inner member and an outer member and the inner member and the outer member are joined together to jointly define a closed cross-section,
wherein a joint end section of the outer member extends up to the joint end section of the upper member, and a joint end section of the inner member extends up to the joint end section of the lower member, and
wherein the respective joint end sections of the upper member and the outer member are joined together and the respective joint end sections of the lower member and the inner member are joined together to thereby form the inner framework, and the respective closed cross-sections are connected to each other at a joint section of the respective joint end sections,
wherein the roof panel has a stepped portion, the outer panel has a stepped portion, and the stepped portion of the roof panel and the stepped portion of the outer panel are joined together to form a recess having a U-shaped cross-section by the respective stepped portions, and
wherein the inner member of the pillar has at a lower side portion of the recess a vertical bead extending in an up-down direction and a horizontal bead extending in a front-rear direction of the vehicle body.

2. The structure for a vehicle body upper portion according to claim 1, wherein the vertical bead transmits a side collision load to the lower member of the roof rail.

3. The structure for a vehicle body upper portion according to claim 1, wherein the horizontal bead transmits a frontal collision or rear collision load to the roof side rail.

4. The structure for a vehicle body upper portion according to claim 1, wherein the vertical bead constitutes a pair of vertical beads that are provided to be spaced in the front-rear direction of the vehicle body, and the horizontal bead is located between the vertical beads.

5. The structure for a vehicle body upper portion according to claim 1, wherein the joint end sections of the roof rail are piled from an upper side on and joined to the joint end sections at an upper end of the pillar.

* * * * *